Nov. 16, 1965  J. J. VOLPE  3,218,012
CAPTIVE PIPE HANGER
Filed Jan. 11, 1965
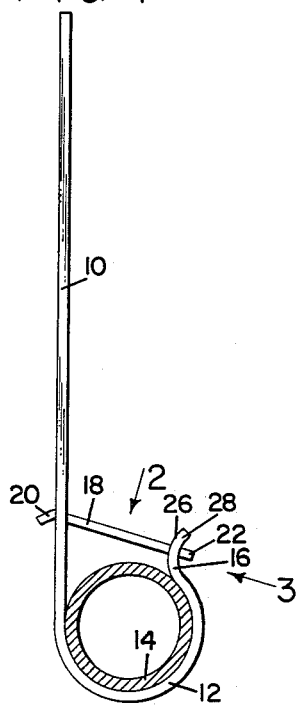
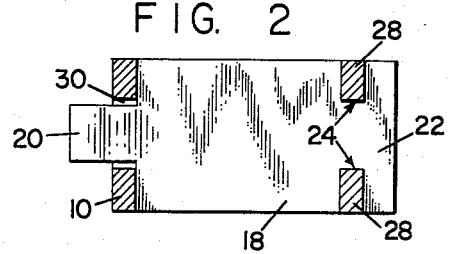
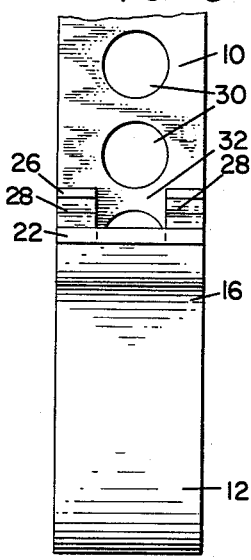
INVENTOR
JOHN VOLPE
BY *Charles R. Fay*
ATTORNEY

United States Patent Office 3,218,012
Patented Nov. 16, 1965

3,218,012
CAPTIVE PIPE HANGER
John J. Volpe, 26 Mechanic St., Milford, Mass.
Filed Jan. 11, 1965, Ser. No. 429,704
3 Claims. (Cl. 248—62)

This invention relates to a new and improved pipe hanger, and the principal object of the invention resides in the provision of a pipe hanger which is inexpensively made but which positively holds a pipe and including special new and improved means applied thereto for positively holding the pipe to the hanger so that it cannot become detached therefrom.

The pipe hanger of the present invention resides in the provision of a light metal strip which is turned up at its lower end to form a hook. This hook is somewhat springy and the pipe may be merely laid in the bight of the hook or sprung into it so that it is normally held in this position, the pipe hanger strap being applied anywhere desired.

However it sometimes happens that vibrations will cause the pipe to accidentally be moved out of the bight of the hook and this invention provides a bridging member attached to the point of the hook and to the strap itself, this member positively locking the pipe in place and preventing any accidental dislodgment thereof.

At the same time the novel bridging or locking member is extremely inexpensive to make and very easy to apply and even to detach when desired, but at the same time it positively holds the pipe in position in the hanger.

Other objects and advantages of the invention will appear hereinafter.

Reference is to be had to the accompanying drawings in which:

FIG. 1 is a view in side elevation illustrating the invention with the pipe held thereby being shown in section;

FIG. 2 is an enlarged view looking in the direction of arrow 2 in FIG. 1, parts being in section, and FIG. 3 is an enlarged view looking in the direction of arrow 3 in FIG. 1.

The pipe hanger of the present invention comprises a strap 10 which is secured in any way desired to a support. It may have several holes in it to receive nails or screws or the like and depends as shown from the support. At its lower end it is provided with a springy hook 12 in the bight of which the pipe at 14 is adapted to be held by the spring action. It will be seen that this hook is reentrantly curved as at 16 in order to have an opening into the bight of a less distance than the diameter of the pipe so that the pipe is resiliently normally held in the hook. It is to be understood of course that the entire strap and hook are made of a strap material which is strong but is easily bent but it has a degree of resilience tending to maintain its shape as to the hook as shown in FIG. 1.

However on some occasions it has been found that the pipe accidentally becomes dislodged from its hook and in order to completely avoid this the present invention provides a locking bridge member 18. This bridge member is as shown in FIG. 2 preferably of approximately the same width and material as the strap 10. At one end it has a bent-down reduced extension 20 and at its opposite end it is provided with a T head 22 by cutting away material close to this end at both sides thereof inwardly from the side edges thereof as is indicated by the reference numeral 24. The bridging member 18 is preferably flat and remains in a single plane except for the down-turned end extension 20.

The extreme end of the reentrant portion of the hook is again bent outwardly as is shown in FIG. 1 at 26 forming a concave locking area comprising a pair of extensions 28, 28 which are concaved in a direction away from the strap 10 as clearly shown in FIG. 1. The strap itself is provided with a series of holes 30 as shown in FIG. 3 for the reception of the downturned extension 20 which is merely snapped thereinto after the T head 22 has been positioned in the slot at 32 which is occasioned by the two spaced extensions 28 above described.

With the head 22 applied therein as shown in FIG. 2, it is merely necessary to snap the downturned extension 20 into a selected hole 30 to accommodate different sizes of pipe, etc., or to apply the bridging locking member 18 where it may be desired.

In any event it will be clearly seen that the new pipe strap locks the pipe in position and it cannot be shaken out of the hook but at the same time the bridge member 18 is quick and easy to apply, and it can also be removed if desired in order to replace the pipe or to reposition it. Each end of the bridge member resists dislodgment in a direction toward the other end, or at right angles thereto.

Having thus described my invention and the advantages thereof, I do not wish to be limited to the details herein disclosed, otherwise than as set forth in the claims, but what I claim is:

1. A pipe hanger comprising a strap, a hook at one end of said strap, said hook being adapted to receive the pipe to be supported, said strap having a hole in it adjacent the hook, and a locking bridging member, means detachably connecting said locking bridging member at one end thereof to the extreme end portion of said hook, an extension on said locking bridging member for entrance into said hole in the strap, said extension being at an incline with respect to the general plane of the locking bridging member so that as it is lodged in said hole, it engages an edge portion thereof and is thereby latched in position.

2. The pipe hanger of claim 1 wherein the interengaging means between the end portion of the locking bridge member and the extreme end portion of the hook comprises a T head construction having a reduced portion, and an inwardly directed slot on the hook, the reduced portion being engaged in said slot and said head being engaged adjacent thereto with said extreme end portion of said hook.

3. The pipe hanger of claim 1 wherein the interengaging means between the end portion of the locking bridge member and the extreme end portion of the hook comprises a T head construction having a reduced portion, and an inwardly directed slot on the hook, the reduced portion being engaged in said slot and said head being engaged adjacent thereto with said extreme end portion of said hook, the latter being provided with a concave-convex configuration, the convex configuration facing the strap and the T head being lodged at the concave side thereof.

References Cited by the Examiner
UNITED STATES PATENTS

| 2,229,129 | 1/1941 | Riegelman | 248—62 |
|---|---|---|---|
| 2,339,992 | 1/1944 | Hohmeister | 248—62 |
| 2,616,645 | 11/1952 | Kindorf et al. | 248—62 |
| 2,999,661 | 9/1961 | Shuter | 248—62 |

References Cited by the Applicant
UNITED STATES PATENTS

| 1,262,763 | 4/1918 | Farley. |
|---|---|---|
| 2,671,625 | 3/1954 | Buckley. |
| 2,744,706 | 5/1956 | Gerdy. |

CLAUDE A. LE ROY, *Primary Examiner.*